US009090996B2

(12) United States Patent
Dee (10) Patent No.: US 9,090,996 B2
(45) Date of Patent: Jul. 28, 2015

(54) MULTIZONE ELECTROBLOWING PROCESS

(75) Inventor: Gregory T. Dee, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 419 days.

(21) Appl. No.: 13/585,952

(22) Filed: Aug. 15, 2012

(65) Prior Publication Data

US 2014/0048982 A1   Feb. 20, 2014

(51) Int. Cl.
| | | |
|---|---|---|
| *B29C 47/88* | (2006.01) | |
| *D01D 5/04* | (2006.01) | |
| *D01D 5/14* | (2006.01) | |
| *D01D 10/02* | (2006.01) | |
| *D01D 5/00* | (2006.01) | |
| *B29C 47/00* | (2006.01) | |

(52) U.S. Cl.
CPC .......... *D01D 5/0038* (2013.01); *B29C 47/0014* (2013.01); *B29C 47/8805* (2013.01); *B29C 47/8885* (2013.01); *D01D 5/003* (2013.01); *D01D 5/0061* (2013.01); *D01D 5/0092* (2013.01)

(58) Field of Classification Search
CPC  B29C 47/0014; B29C 47/88; B29C 47/8805; B29C 47/8885; D01D 5/0007; D01D 5/0015; D01D 5/003; D01D 5/0038; D01D 5/0046; D01D 5/0092; D01D 5/04; D01D 5/14; D01D 10/02
USPC ......... 264/10, 210.8, 211.14, 211.15, 211.17, 264/464, 465, 466, 484, 555
See application file for complete search history.

(56) References Cited

U.S. PATENT DOCUMENTS

| | | | |
|---|---|---|---|
| 2,810,426 A | 10/1957 | Till et al. | |
| 7,465,159 B2 | 12/2008 | Armantrout et al. | |
| 7,582,247 B2 | 9/2009 | Armantrout et al. | |
| 7,585,451 B2 | 9/2009 | Bryner et al. | |
| 7,618,579 B2 | 11/2009 | Kim et al. | |
| 7,846,374 B2 | 12/2010 | Hovanec | |
| 2006/0049542 A1 | 3/2006 | Chu et al. | |
| 2011/0144297 A1* | 6/2011 | Dennes et al. | ................ 528/183 |

FOREIGN PATENT DOCUMENTS

| | | |
|---|---|---|
| WO | WO 03/080905 | 10/2003 |
| WO | WO2011/118893 | 9/2011 |

OTHER PUBLICATIONS

PCT International Search Report and Written opinion for International Application No. PCT/US2013/054894 Dated Nov. 13, 2013.

* cited by examiner

*Primary Examiner* — Leo B Tentoni (57) ABSTRACT

Methods and apparatuses are provided for producing fibers via electroblowing. In an embodiment of the present invention, a polymer stream, formed from a spinning nozzle, passes through a first temperature zone for a first residence time, and subsequently passes through a second temperature zone for a second residence time, where the second zone has a higher average temperature than the first zone. In an embodiment of an apparatus of the present invention, the apparatus has a region between the spinning nozzle outlet and collector that includes at least two zones through which a polymer stream passes, where the second zone has a higher average temperature than the first zone.

7 Claims, 5 Drawing Sheets

MULTIZONE ELECTROBLOWING PROCESS

FIELD OF THE INVENTION

Background

The electroblowing process is thought to involve the formation of fibers by the attenuation of a process solution thread line produced by high speed air jets and by the presence of charge on the fibers. The charge on the fibers can be induced by the presence of a strong electric field near the spinneret. The fiber formation and solvent removal takes place in the jet plume volume between the spinning pack and the collector.

Ideally the operator of the process would like to make smaller fibers while increasing the maximum process throughput. The conventional process allows one to achieve only one of these goals at the expense of the other. A way is needed therefore of decoupling the competing effects of spinning and drying temperatures on fiber size and throughput.

SUMMARY OF THE INVENTION

The present invention is related to methods and apparatuses for electroblowing in which a spin cell comprises at least two zones, optionally separated by a physical partition. A first zone (zone 1) includes a spin pack and the fiber formation volume adjacent to the pack, wherein the temperature is controlled to be relatively low relative to the second zone, and a second zone (zone 2) where the temperature is increased relative to the first zone. The process comprises the steps of electroblowing a polymer solution and passing the polymer stream formed sequentially through zones 1 and 2.

In one embodiment, the invention is directed to a method for producing fibers that includes the steps of electroblowing a polymer solution from a spinneret having a spinning nozzle with an outlet end, where the polymer solution contains at least one polymer and at least one solvent, where the electroblowing comprises the steps of:
   a) discharging the polymer solution from the spinning nozzle into an electric field while injecting gas from a gas nozzle located proximate to the outlet end of the spinning nozzle;
   b) forming a polymer stream containing polymer fibers from the discharged polymer solution, removing solvent (e.g., via evaporation) and depositing the polymer fibers onto a collector; and
where the polymer stream passes through a first zone that is held at a first average temperature T1 for a first residence time, and then subsequently passes through a second zone, that is held at a second average temperature T2 for a second residence time, and where the second temperature T2 is higher than the first temperature T1.

In an embodiment, there is more than one gas nozzle and/or spinning nozzle. In another embodiment, the gas nozzles surround the spinning nozzle(s) and are concentric with them.

In still further embodiments, the temperature difference between T2 and T1 is in the range of from about 20° C. to about 200° C. In some embodiments, T1 is in the range of from about 20° C. to about 40° C.

In yet other embodiments, the second length D2 is between 1 and 5 times the first length D1, and preferably 1 to 3 times the first length D1. In other embodiments, the residence time of the polymer stream in zone 1 is typically 0.1 to 10 milliseconds, preferably 0.5 to 2 milliseconds. In some embodiments, the residence time of the polymer stream in zone 2 is from 1 to 20 times that in zone 1, preferably 1 to 5 times that in zone 1.

In some embodiments, the polymer solution that is discharged from the spinning nozzle contains at least one polymer selected from polyimide, nylon, polyaramide, polybenzimidazole, polyetherimide, polyacrylonitrile, PET (polyethylene terephthalate), polypropylene, polyaniline, polyethylene oxide, PEN (polyethylene naphthalate), PBT (polybutylene terephthalate), SBR (styrene butadiene rubber), polystyrene, PVC (polyvinyl chloride), polyvinyl alcohol, polyvinylidene fluoride, polyetyher sulfone, polyvinyl butylene, or derivatives or copolymers thereof or any combination thereof.

The present invention is further directed to apparatuses for electroblowing fibers. In one embodiment, the apparatus includes:
   a) a spinning nozzle having an outlet end for discharging a polymer solution;
   b) a gas nozzle disposed proximate to the outlet end of the spinning nozzle for injecting compressed gas to form a gas stream;
   c) a collector for collecting fiber formed from the discharged polymer solution;
   d) a voltage that is applied to i) the spinning nozzle, or ii) the collector, or iii) an optional electrode that is electrically isolated from the spinning nozzle and the collector, where an electric field is generated between all three or any two of the spinning nozzle, collector and optional electrode;
   where between the spinning nozzle outlet and collector comprises at least two zones through which a polymer stream formed from the discharged polymer solution passes; where the spinning nozzle outlet is disposed to discharge into the first zone, and where the first zone has a first length D1 and is maintained at a first average temperature T1; where the second zone is located in a region between the end of the first zone and before the collector, has a second length D2, and is maintained at a second average temperature T2; and where the second zone average temperature T2 is higher than the first zone average temperature T1.

In one embodiment of the invention the region between the spinning nozzle and the collector comprises at least two zones optionally separated by a physical partition through which fibers can pass from the spinning nozzle to the collector. In other embodiments the zones have controlled air flow and humidity in addition to temperature. In yet further embodiments of the invention, other zones of controlled air flow, humidity, and/or temperature may be located between the first and second zones, after the second zone, and/or inside the first or second zones. In some embodiments, the second zone of the apparatus begins at the end of the first zone and ends adjacent to the collector.

In a further embodiment of the apparatus, the temperature in the first zone and/or second zone may be controlled by supplying into the first and/or second zone a gas, such as air, maintained at a particular temperature or temperature range. In such embodiments, the first and/or second zones may include gas inlet ports for the gas.

In yet further embodiments of the invention, no physical partition is present between the first zone and the second zone and the relative distances D1 and D2 are determined by a first flow rate (Q1) of gas supplied to the first zone and a second flow rate (Q2) of gas supplied to the second zone and a gas jet flow rate (Qv) emitted from the gas nozzle, and where the ratio Q1/Qv is between 1 and 7, or even between 4 and 7.

In a still further embodiment, the apparatus further includes a third zone where the first zone is at least partially located within the third zone, and where the third zone includes an enclosure, such as a wall, that at least partially encloses the first zone, and where the enclosure has one or more openings through which gas can pass from the third zone into the first zone. In one embodiment, zone 3 includes a gas, such as air, supplied to it for controlling the temperature of the first zone. Air or other gas can pass from the third zone into the first zone through openings or perforations in the enclosure of the third zone.

In one embodiment of the invention where a third zone is present in the apparatus, no physical partition is present between the first zone and the second zone and the relative distances D1 and D2 are determined by a first flow rate (Q3) of gas supplied to the third zone (which passes into the first zone) and a second flow rate (Q2) of gas supplied to the second zone and a gas jet flow rate (Qv) emitted from the gas nozzle, where the ratio of Q3/Qv is between 1 and 7. In other embodiments where no physical partition is present between the first zone and the second zone, the relative distances D1 and D2 are determined by a first flow rate (Q3) of gas supplied to the third zone and a second flow rate (Q2) of gas supplied to the second zone, where the ratio Q3/Q2 is between 0.3 and 1.5, or even between 0.8 and 1.2.

In one embodiment of the apparatus the second length D2 is between 1 and 5 times the first length D1 and preferably 1 to 3 times the first length D1.

DETAILED DESCRIPTION OF THE INVENTION

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is directed to processes and apparatuses for electroblowing, to form fibers, including for example nanofibers. Electroblowing processes are described in U.S. Pat. Nos. 7,846,374; 7,618,579; 7,585,451; 7,582,247; and 7,465,159 all assigned to DuPont and all incorporated herein by reference in their entirety. Electroblowing of polymer solutions to form a nanoweb is also described in detail by Kim et al. in World Patent Publication No. WO 03/080905, corresponding to U.S. patent application Ser. No. 10/477,882, incorporated herein by reference in its entirety.

In an embodiment of electroblowing, the process includes the steps of feeding a polymer solution, which contains one or more polymers dissolved or dispersed in a solvent or mixtures of solvents, to a spinning nozzle; discharging the polymer solution via the spinning nozzle, into an electric field, while injecting compressed gas, normally air, in the form of an air jet through a separate nozzle proximate to the spinning nozzle such that the compressed gas impinges on the polymer solution as it is discharged from the outlet end of the spinning nozzle; and forming polymer fibers from the polymer solution, and depositing the polymer fibers on a grounded collector. The collector may also be optionally enhanced in one embodiment by the application of vacuum under the collector.

DEFINITIONS

In the present specification, the terms "spin head", "spin pack" are synonymous with "spinneret" and refers to the entire assembly comprising the spinning nozzle, through which polymer solution passes, and a second nozzle, if it is present, through which gas such as air passes.

The term "spin cell" as used herein refers to the entire assembly of spin head, collector and the space between them.

The term "process jet" or "process jet stream" as used herein refers to the combined streams of polymer, solvent and gas (such as air) issuing from the spinneret or the gas may issue from a nozzle proximate to the spinneret.

The term "proximate" as used herein, in connection with the positioning of the gas nozzle in relation to the spinning nozzle, means that the gas nozzle is positioned to permit the gas stream (also referred to herein as a "gas jet"), such as air, to impinge upon the polymer solution exiting the spinning nozzle. The gas jet (such as an air jet) can be configured to blow axially symmetrically to the polymer stream as it leaves the spin head. In a further embodiment of the process, the gas jet does not blow axially symmetrically to the polymer stream flow, but blows from slots proximate to and on either side of a single hole or a row of holes.

The term "polymer stream" as used herein refers to a stream containing polymer fibers and solvent that is formed as polymer solution is discharged from a spinneret. The polymer fibers formed may be continuous, discontinuous, or a mixture thereof. In an embodiment of the present invention, the polymer fibers formed are "continuous" in that there is an unbroken stream of polymer fibers that pass from around the outlet of the spinning nozzle to the collector. In such an embodiment, multiple continuous fiber strands can form from each spinneret hole through the interaction of the gas jet on the polymer solution as the polymer solution exits the spinning nozzle.

By "nanofibers" it is meant fibers having a number average diameter of less than about 1000 nm, and even less than about 800 nm, and even between about 50 nm and 800 nm, and even between about 50 nm and about 500 nm. In the case of non-round cross-sectional nanofibers, the term "diameter" as used herein refers to the greatest cross-sectional dimension.

By "room temperature" herein is meant a temperature in the range of from about 20° C. to about 30° C.

Process of the Invention

The present invention is related to a process for electroblowing in which a process jet passes through at least two zones before impinging on a collector. In some aspects, the invention is directed to a method for producing fibers, such as nanofibers, comprising the steps of electroblowing a polymer solution from a spinneret, where the process jet exits the spinneret into a first zone. The first zone has a first length and is held at a first average temperature. The process jet passes through the first zone for a first residence time, and then passes through a second zone having a second length that is held at a second average temperature for a second residence time, where the second average temperature is higher than the first average temperature.

It is believed that by having a first zone held at a cooler temperature as described herein, evaporation of solvent is reduced in the first zone leading to the formation of fibers having smaller diameters. The polymer stream subsequently enters zone 2 which is the hotter region of the process jet and promotes rapid evaporation and drying of the fibers. Additionally, it is advantageous in some embodiments, that gas (such as air), which is supplied to zones 1 and 2 to control the temperature of each of these zones is supplied in such a way as to leave the flow profile of the process jet undisturbed. Thus, the present apparatus and process of the invention is capable of producing small fiber diameters without sacrificing throughput.

The terms "T1" and "T2" are average temperatures over the distance that the process jet travels in zones 1 and 2 respectively. The temperature difference between T2 and T1 is typically in the range of from about 20° C. to about 200° C. T1 typically ranges from about 20° C. to about 40° C., however it may be outside this range depending on the choice of solvent. T2 may be chosen based on the desired temperature for evaporating or removing the solvent from the polymer stream. T2 may be for example in the range of from about 45° C. to about 270° C., from about 55° C. to about 200° C., or from about 58° C. to about 160° C.

The residence time of the polymer stream in zone 1 is typically from about 0.1 milliseconds to about 10 milliseconds, preferably from about 0.5 milliseconds to about 2 milliseconds. The residence time of the polymer stream in zone 2 is typically from about 1 to about 20 times that in zone 1, preferably from about 1 to about 5 times that in zone 1. As used herein "residence time" means the time that a point on the polymer stream takes to completely pass through a given zone, from the start of the zone to the end of the zone.

Polymers useful in the process of the invention are not restricted to thermoplastic resins, and may include most synthetic resins, including thermosetting resins. Examples of the suitable polymers include polyimide, nylon, polyaramide, polybenzimidazole, polyetherimide, polyacrylonitrile, PET (polyethylene terephthalate), polypropylene, polyaniline, polyethylene oxide, PEN (polyethylene naphthalate), PBT (polybutylene terephthalate), SBR (styrene butadiene rubber), polystyrene, PVC (polyvinyl chloride), polyvinyl alcohol, PVDF (polyvinylidene fluoride), polyvinyl butylene, poly ether sulfone, derivatives or copolymers thereof, or any combination thereof.

The polymer solution useful in the present invention includes at least one polymer and at least one solvent. The polymer solution may be prepared by dissolving or dispersing the polymer(s) in the at least one solvent. It is noted that the polymer does not have to be dissolved in the polymer solution. For example, the polymer may be partially or completely dispersed in the solution. Although dissolving or dispersing the polymer(s) may not require any specific temperature ranges, heating may be needed to assist in the dissolution or dispersion of the polymer(s). In one embodiment, the concentration of polymer in the polymer solution is at least about 1.0 wt %, in other embodiments ranges from about 1.0 wt % to about 60 wt %, and yet in other embodiments ranges from about 3 wt % to about 45 wt %, based on the total weight of the polymer solution.

The polymer solution can also contain one or more additives including for example any resin compatible with an associated polymer, plasticizer, ultraviolet ray stabilizer, crosslink agent, curing agent, reaction initiator or combinations thereof.

The polymer fibers produced in some embodiments of the invention have a number average fiber diameter of about 1600 nm or less, in other embodiments less than about 1000 nm and in yet other embodiments less than about 800 nm, or even between about 50 nm and 800 nm, or yet even between about 50 nm and about 500 nm. The polymer fibers produced may be continuous, discontinuous or mixtures thereof. In some embodiments the polymer fibers produced are substantially continuous or completely continuous. By "substantially continuous", it is meant that during operation of the process, unbroken fibers exist between the outlet of the spinning nozzle and collector surface, but there may be occasional breakages in the fibers produced. Discontinuous fibers may be produced for example by increasing the gas jet flow until the fibers break apart into non-continuous fiber strand pieces.

Apparatus of the Invention

In another aspect of the invention, an apparatus is provided for electroblowing fibers, such as nanofibers, comprising a spinning nozzle having an outlet end for discharging a polymer solution; a gas nozzle disposed proximate to the outlet end of the spinning nozzle for injecting compressed gas (such as air); and a collector for collecting spun fiber formed from the polymer solution.

A voltage is applied to i) the spinneret, or ii) the collector, iii) or an optional electrode that is electrically isolated from the spinning nozzle and the collector, to generate an electric field between all three of or any two of the spinning nozzle, collector, or optional electrode.

Figure 1:
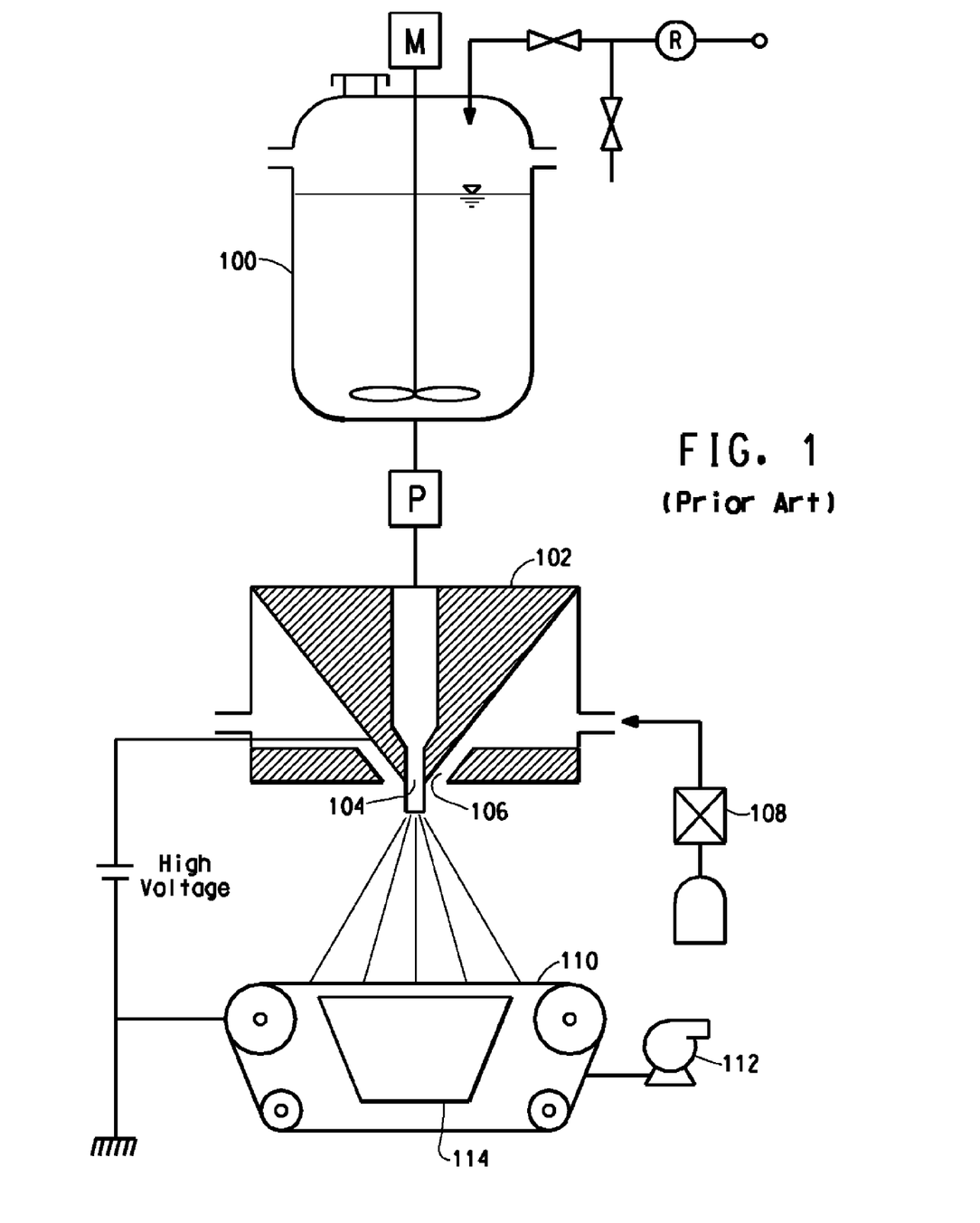
FIG. 1 shows a schematic drawing of a prior art electroblowing apparatus.

Turning now to the Figures, FIG. 1 is a schematic diagram of an electroblowing apparatus useful for electroblowing (or "electro-blown spinning") as described in International Publication Number WO2003/080905. This prior art electroblowing method comprises feeding a solution of a polymer in a solvent from a storage tank 100, through a spinneret 102, to a spinning nozzle 104 to which a high voltage is applied, while compressed gas or blowing gas is directed toward the polymer solution through a blowing gas nozzle 106 as the polymer solution exits the spinning nozzle 104 to form fibers, and collecting the fibers into a web on a grounded collector 110 under vacuum created by vacuum chamber 114 and blower 112.

The charge in an electroblowing process may be applied in other configurations, as detailed for example in U.S. Pat. Nos. 7,846,374; 7,618,579; 7,585,451; 7,582,247; and 7,465,159. One skilled in the art will recognize that there are various configurations for generating an electric field suitable for electroblowing the polymer stream and the present invention is not to be considered limited by the means of generating an electric field.

Figure 2:
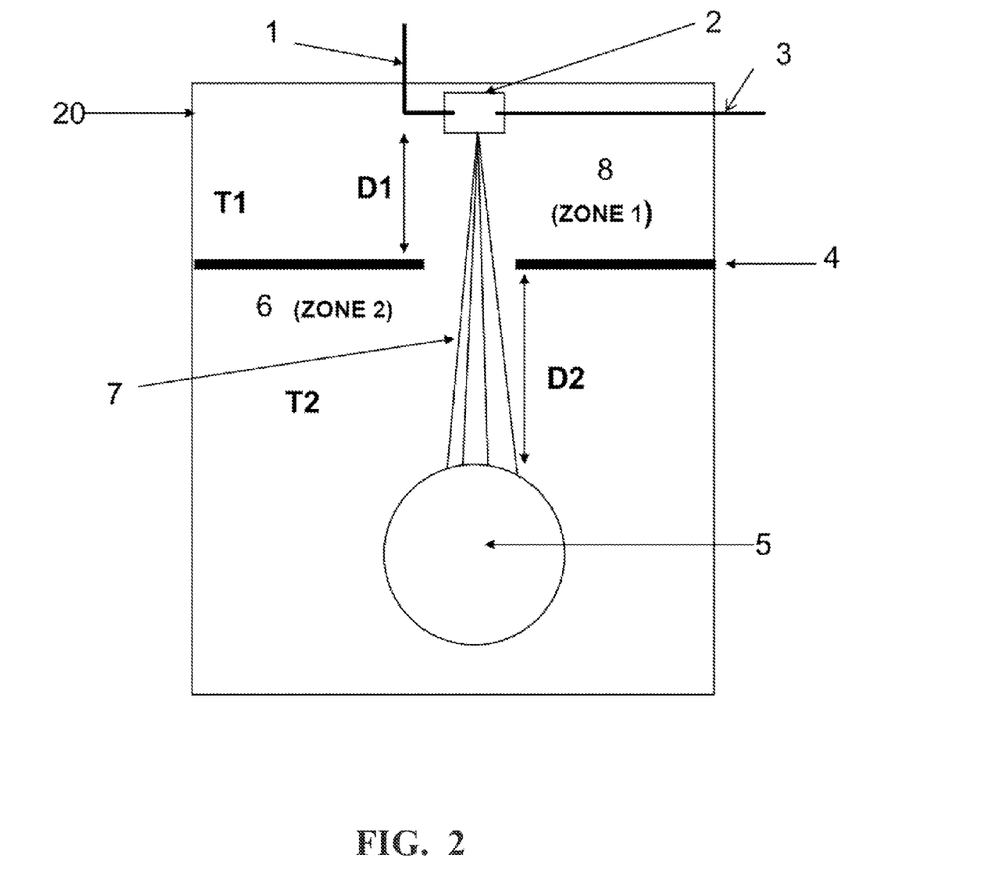
FIG. 2 shows a schematic drawing of an embodiment of an electroblowing apparatus and process of the invention.

FIG. 2 is an embodiment of an apparatus and process of the present invention shown schematically. FIG. 2 shows a spinning assembly (20) useful in the present invention. A process solution (1) such as a polymer solution and a gas stream (3) of compressed gas are fed to a spin head (2) and a process jet stream (7) is formed from the process solution (1) and gas stream (3). The spin head (2) may be charged relative to the collector (5), or may be grounded and the collector (5) charged. Alternatively, a process jet stream (7) may be charged by external electrodes (not shown) located in at least one of the spin zones (e.g., zone 1 or 2). An optional physical zone partition (4) separates the two zones, zone 1 (8) and zone 2 (6), where zone 1 (8) is kept at an average temperature T1 that is cooler than zone 2 (6), kept at an average temperature of T2. The process jet stream (7) which includes the polymer stream passes through zone 1 (8) for a distance of D1 (i.e., the length of zone 1 (8)) for a first residence time. Once passing through zone 1 (8), the process jet stream enter zone 2 (6) and travels a distance of D2 (the length of zone 2 (6)) for a second residence time. In the embodiment shown in FIG. 2, D1 is the distance between the outlet end of the spin head (2) and the start of zone 2 (6), while D2 is the distance between the end of zone 1 (8) and the collector.

In a further embodiment of the apparatus shown in FIG. 2, in zone 2 (6) the temperature of zone 2 (6) is adjusted by supplying hot gas (not shown), such as air, directly to zone 2 (6), which mixes with the ambient air/gas in zone 2 (6) to produce an average temperature of T2 in zone 2 (6). In such an embodiment, zones 1 and 2 have separate supplies of gas, such as air, to control the average temperatures T1 and T2 respectively. The process jet stream (7) is thus exposed to an average temperature of T1 in zone 1 (8) for a length of D1 and to an average temperature of T2 in zone 2 (6) for a length D2, where T1 is cooler than T2.

In an embodiment in which no physical partition (4) is present, the relative distances D1 and D2 are determined by the relative gas flow rates (such as air flow rates) to zones 1 and 2 (Q1 and Q2 respectively), and the gas flow rate (Qv) of the gas (such as air) jet/stream (3). In some embodiments, the ratio Q1/Qv is typically 1 to 7, and preferably 4 to 7. The ratio Q1/Q2 is typically 0.3 to 1.5 and preferably 0.8 to 1.2.

The temperature of the gas stream Q1 entering zone 1 (8) is typically room temperature to about 40° C. The temperature of the gas stream Q2 entering zone 2 (6) is typically, from about 60° C. to about 280° C., or in some embodiments from about 100° C. to about 280° C. The temperature of the gas stream (3) which is proximate to the spin head (2) is typically room temperature to 40° C. However, as previously described herein, the selection of these temperatures will depend on the desired temperatures T1 and T2, which will depend on for example the choice of solvent and polymer chosen.

The terms "T1" and T2" are average temperatures over the distance that the process jet stream (7) travels in zones 1 and 2 respectively. The temperature difference T2-T1 is typically 20° C.-200° C. T1 typically ranges from room temperature to 40° C., and in other embodiments is room temperature. T2 may be chosen based on the desired temperature for evaporating or removing the solvent from the polymer stream. T2 may be for example in the range of from about 45° C. to about 270° C., from about 55° C. to about 200° C., or from about 58° C. to about 160° C.

Figure 3:
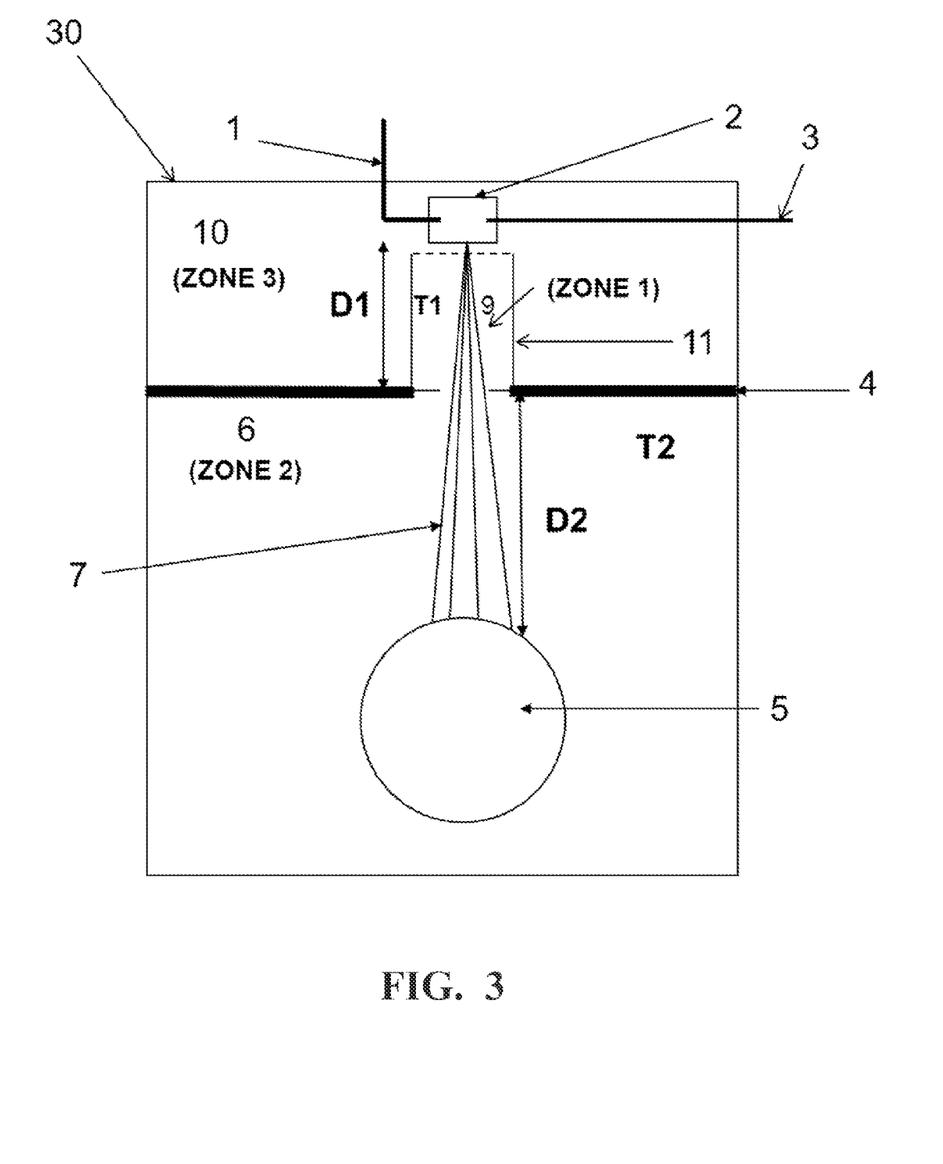
FIG. 3 shows a schematic drawing of a further embodiment of an electroblowing apparatus and process of the invention.

FIG. 3 shows another embodiment of an apparatus and process of the invention. In the spinning assembly (30) of FIG. 3, a first zone (9) is located inside a third zone (10) as shown in schematic form in FIG. 3, to at least partially enclose a space that the spinning nozzle discharges the polymer stream into. The first zone (9) may or may not enclose the spin head (2). FIG. 3 shows an embodiment in which it does not enclose the spin head (2). For example, FIG. 3 shows an embodiment in which the zone 1 (9) is proximate to the outlet of the spin head (2) but does not enclose it. The first zone (9) extends from adjacent to the outlet end of the spinning nozzle of the spin head (2) to the interface with zone 2 (6). The interface may comprise an optional partition (4) with an opening where the polymer stream may pass from zone 1 (9) into zone 2 (6). The enclosure (11) of zone 1 (9) in this embodiment allows air or other gas to pass from the third zone (10) into the first zone (9) through openings (not shown) in the wall of the enclosure (11), and fiber can pass through the first zone (9) from the outlet of the spinning nozzle to and through the opening of the partition (4), in FIG. 3. The end of the first zone (9) that is adjacent to the spinning nozzle may be completely open, or may have suitable openings to allow gas (e.g. air) and/or fiber to pass through the zone.

In FIG. 3, temperature control of zone 1 (9) is achieved via a supply of gas, such as air, (not shown) from zone 3 (10). For example, in one embodiment, cold air from zone 3 (10) may enter zone 1 through perforations or openings in the wall of zone 1, or through the top of zone 1, or both.

Zone 2 (6) temperature is adjusted by supplying hot gas, such as air to directly or indirectly to zone 2 (6), which mixes with the ambient air/gas in zone 2 (6). Zones 3 and 2 preferably have external gas (e.g. air) supplies connected to them. The process jet stream (7) is thus exposed to cold air (relative to zone 2 (6)) in zone 1 (9) for a length of D1, and exposed to warmer air (relative to zone 1 (9)) in zone 2 (6) for a length D2.

In the embodiment of FIG. 3 in which no physical partition (4) is present, the relative distances D1 and D2 are determined by the relative gas flow rates to zones 3 and 2 (Q3 and Q2 respectively), and the gas flow rate (Qv) of the gas (e.g., air) jet/stream (3). The ratio Q3/Qv is typically 1 to 7, and preferably 4 to 7. The ratio Q3/Q2 is typically 0.3 to 1.5 and preferably 0.8 to 1.2.

The temperature of the gas stream entering zone 3 is typically room temperature to about 40° C. The temperature of the gas stream Q2 entering zone 2 (6) is typically, from about 60° C. to about 280° C., or in some embodiments from about 100° C. to about 280° C. The temperature of the gas stream (3) which is proximate to the spin head (2) is typically room temperature to 40° C. However, as previously described herein, the selection of these temperatures will depend on the desired temperatures T1 and T2, which will depend on for example the choice of solvent and polymer chosen.

Voltage is applied to the spinneret, collector or optional external electrodes preferably in the range of about 1 to 300 kV and more preferably of about 10 to 100 kV with a conventional high voltage charging means. The polymer solution can be discharged in a pressure ranging from about 0.01 to 200 kg/cm$^2$ and preferably about 0.1 to 20 kg/cm$^2$. This allows the polymer solution to be discharged in large quantities adequate for mass production of nanofibers.

In a further independent embodiment, the apparatus further comprises a capillary tube in a lower portion of the spinning nozzle, wherein the capillary tube has a diameter of about 0.1 to 2.0 mm and a ratio of length to diameter of about 1 to 20.

In a still further embodiment of the apparatus, the gas nozzle for injecting compressed gas (such as air) is disposed on a knife edge at both sides of the spinning nozzle, and has a distance or air gap of about 0.1 to 5.0 mm.

In a still further embodiment, the gas nozzle has a cylindrical shape for circularly surrounding the spinning nozzle and a width or air gap of about 0.1 to 5.0 mm.

The lower end of the spinning nozzle may be spaced from the collector from about 1 cm to about 200 cm, and preferably from about 25 cm to about 60 cm.

EXAMPLES

Test Methods

Fiber Diameter was determined as follows. Two to three scanning electron microscope (SEM) images were taken of each fine fiber layer sample.

The diameter of clearly distinguishable fine fibers were measured from the photographs and recorded. Defects were not included (i.e., lumps of fine fibers, polymer drops, intersections of fine fibers). The number average fiber diameter from about 50 to 300 counts for each sample was calculated.

The Apparatus

The apparatus used in the examples consisted of a spin assembly as shown in FIG. 3. There was a physical partition (4) between zones 1 and 2 and an enclosure separating zone 1 from zone 3.

Zone 1 contained a spin head which had one centrally located hole for spinning solution. The hole had an axially symmetric air jet that blew air past the spinneret hole. Air was supplied to zone 3 and then entered zone 1 through the top of zone 1 which was open. The only exit for the air that was supplied to zone 3 was through zone 1 to zone 2. In zone 2, the temperature was adjusted by supplying hot air which mixed with the ambient air in zone 2. The process jet stream was thus exposed to cold air (relative to zone 2) in zone 1 and of variable length D1 and to hot air in zone 2 (relative to zone 1) where the process jet stream traveled a length D2 before being collected on a collector.

Results

Comparative Example A

A 25 wt % solution of a polystyrene (PS) (DOW 685-D), was dissolved in dimethylforamide (DMF) at room temperature. A small amount of lithium chloride (LiCI) was also added to the solution to improve its electrical conductivity. A magnetic stirrer was used to agitate the solution. The homogeneous solution was transferred to a sealed glass container and transported to the spin chamber. The solution was transferred into the reservoir and sealed. A single spinning nozzle spinneret spin pack was used for this experiment with a 0.4064 mm inside diameter spinning nozzle.

The equipment configuration of FIG. 3 was used. A drum collector was used to collect the sample. The spin head was placed at a negative potential of 100 kV. The collector was grounded. The distance from the spinneret exit to the drum surface was 37 cm. Air was used for the process gas jet/stream. The relative humidity of the air entering the system was controlled to be less than 10%. In the first experiment both zones 3 and 2 were maintained at a constant temperature of 31° C. A polymer solution flow rate of 0.83 ml/min to the spinneret was maintained. This was close to the maximum solution throughput that could be achieved at this spin cell temperature. At higher solution throughputs the sheet exhibited wet spots indicating incomplete drying of the fibers.

The flow of air jet (Qv) (gas stream (3) in FIG. 3) was controlled to maintain an exit velocity on the order of 100 m/sec. Once the solution flow was initiated, fiber was visible in the plume. Fiber was deposited in a swath on the drum. After the run a sheet sample was collected for fiber size analysis. The number average fiber diameter of the fibers was measured to be 793 nanometers.

Example 1

In this example a polymer solution with the same composition and preparation techniques as described in comparative example A was used. The distance from the spinneret exit to the drum surface was 50 cm. The zone 1 length was 16.5 cm and the zone 2 length was 33.5 cm. Zone 3 was maintained at a temperature of 31° C. and zone 2 was maintained at a temperature of 62° C. Air was used for the gas jet/stream. The relative humidity of air in all zones was controlled to be less than about 10%. A solution flow rate of 2.7 ml/min was maintained. This was close to the maximum solution throughput that could be achieved at this zone 2 temperature. At higher solution throughputs the sheet exhibited wet spots indicating incomplete drying of the fibers.

The flow of the air jet (Qv) (gas stream (3) in FIG. 3) was controlled to maintain an exit velocity on the order of 100 m/sec. The air jet temperature was close to 23° C. Once the polymer solution flow was initiated, fiber was visible in the plume. Fiber was deposited in a swath on the drum. After the run a sheet sample was collected for fiber size analysis. The number average fiber diameter of the fibers was measured to be 767 nanometers with a similar variance as in comparative example A.

Therefore, the implementation of the multizone spinning geometry allowed for manufacture of fibers with the same fiber diameter but at process solution throughputs that were greater than three times those achieved with the single zone spinning technique.

Example 2

Example 2 shows the relationship between the cold air flow of Q3 to zone 1 and the fiber diameter of the sheet material made at those process settings. A single sheet roll was prepared and the cold air flow rate Q3 to zone 1 during the course of the run was varied. Although a physical partition was present, it did not serve as a boundary defining zones 1 and 2. The relative positions of zones 1 and 2 were determined by the relative air flow rates between Q2 and Q3, and the flow rate of the air jet Qv.

Figure 4:
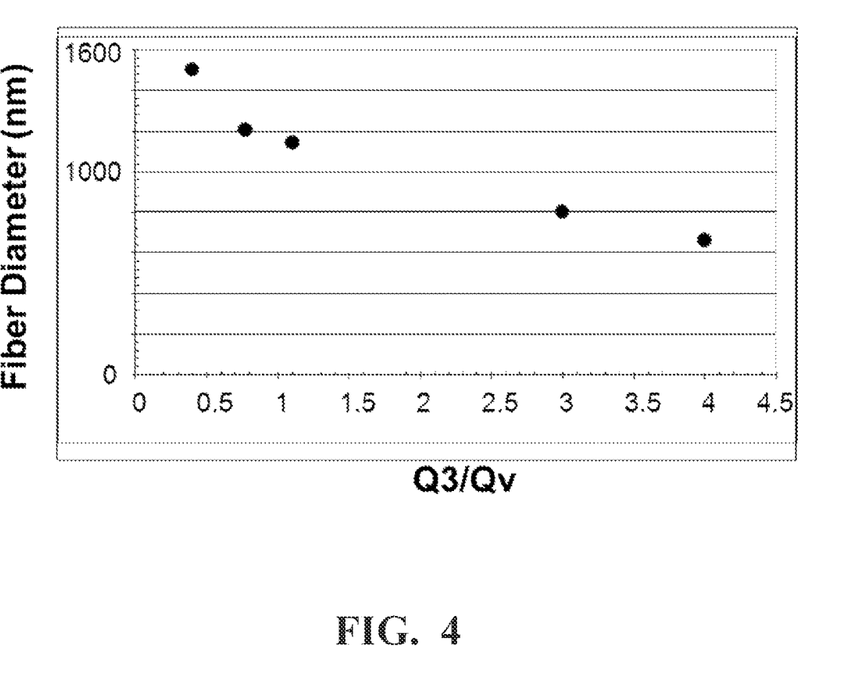
FIG. 4 shows a plot of fiber size versus air flow ratio Q3/Qv for an embodiment of a process of the invention.

A 23 wt % polyamic acid solution in DMF was prepared. The solution viscosity was 6 Pa sec. The solution flow rate during the experiment was maintained close to 1.5 ml/min/h. A one hole spin pack (i.e., head) was used for this experiment. The diameter of the spin hole was 15 mils (0.375 mm). The distance from the pack face to the surface of the drum collector was 34 cm. The temperature in zone 3 varied from 25° C. to 32° C. during the course of the experiment. The temperature in zone 2 varied from 58° C. to 85° C. during the course of the experiment. The pack was maintained at a potential of 100 kV and the drum collector was grounded. FIG. 4 shows the fiber diameters as measured at various cold air flow rates Q3 to zone 1 where the cold flow air supply is labeled in dimensionless units of Q3/Qv, where Q3 is the flow rate of air to zone 1 and Qv is the fixed air jet flow rate of gas stream (3) in FIG. 3.

Increasing Q3 relative to Qv increased the distance D1 for which the polymer solution was held at the lower, zone 1, temperature. FIG. 4 shows a decrease in the mean fiber diameter with increasing values of Q3/Qv.

Example 3

Figure 5:
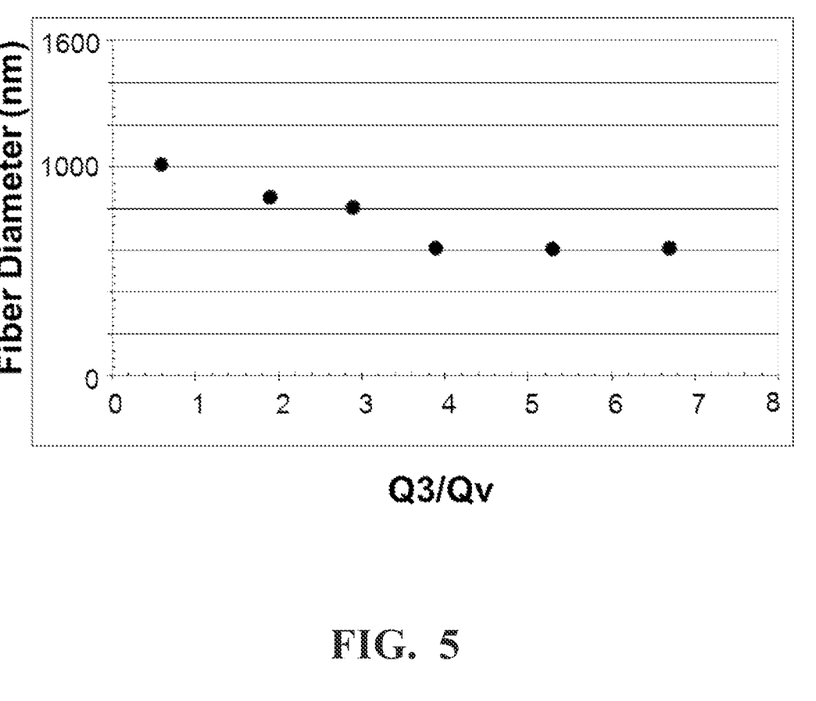
FIG. 5 shows a plot of fiber size versus air flow ratio Q3/Qv for an embodiment of a process of the invention.

Example 3 again shows the relationship between the cold air flow rate Q3 to zone 1 and the fiber diameter of the sheet material made at those process settings. This experiment involved making a single sheet roll and changing the cold air flow rate Q3 to zone 3 during the course of the run. A 23 wt % polyamic acid solution in dimethyl formamide (DMF) was prepared. The solution viscosity was 6 Pa sec. The solution flow rate during the experiment was maintained close to 1.4 ml/min/h. A one hole spin pack (i.e., head) was used for this experiment. The diameter of the spin hole was 15 mils (0.375 mm.) A 6 cm slot jet was used with this pack and the geometry was similar to that described in example 2. The flow rate of the gas jet/stream was 10.1 SCFM. The distance from the pack face to the surface of the drum collector was 34 cm. The temperature in zone 1 varied from 30° C. to 31° C. during the course of the experiment. The temperature in zone 2 varied from 68 to 82° C. during the course of the experiment. The pack was maintained at a potential of 100 kV and the drum collector was grounded. FIG. 5 shows the fiber diameters as measured at various cold air flow rates Q3 to zone 1 where the cold air flow supply is labeled in dimensionless units of Q1/Qv, where Q3 is the flow rate of gas to zone 1 and Qv is the fixed air jet flow rate (gas stream (3) in FIG. 3). FIG. 5 shows a decrease in the mean fiber diameter with increasing values of Q3/Qv. The graph shows that as more cold air is pushed into the upper sections (zone 1) of the process jet the mean fiber diameter is lowered while maintaining a higher solution throughput. The data show that there is a maximum value of the ratio Q3/Qv, equivalent to a ratio of D1/D2 in FIG. 3, above which there is no further decrease in the fiber diameter.

I claim:

1. A method for producing fibers comprising the steps of electroblowing a polymer solution from a spinneret having a spinning nozzle with an outlet end, wherein the polymer solution comprises at least one polymer and at least one solvent, wherein the electroblowing comprises the steps of:
    a) discharging the polymer solution from the spinning nozzle into an electric field while injecting gas from a gas nozzle located proximate to the outlet end of the spinning nozzle;
    b) forming a polymer stream containing polymer fibers from the discharged polymer solution, removing solvent and depositing the polymer fibers onto a collector; and
wherein the polymer stream passes through a first zone that is held at a first average temperature T1 for a first residence time, and subsequently passes through a second zone, that is held at a second average temperature T2 for a second residence time, wherein the second temperature T2 is higher than the first temperature T1, and wherein the residence time of the polymer stream in the first zone is in the range of from about 0.1 milliseconds to about 10 milliseconds.

2. The method of claim 1 wherein the temperature difference between T2 and T1 is in the range of from about 20° C. to about 200° C.

3. The method of claim 2 wherein T1 is in the range of from about 20° C. to about 40° C.

4. The method of claim 1 wherein the residence time of the polymer stream in the first zone is in the range of from about 0.5 milliseconds to about 2 milliseconds.

5. The method of claim 1 wherein the residence time of the polymer stream in the second zone is in the range of from about 1 to about 20 times that in the first zone.

6. The method of claim 4 wherein the residence time of the polymer stream in the second zone is in the range of from about 1 to about 5 times that in the first zone.

7. The method of claim 1, wherein the polymer solution comprises a polymer selected from polyimide, nylon, polyaramide, polybenzimidazole, polyetherimide, polyacrylonitrile, PET (polyethylene terephthalate), polypropylene, polyaniline, polyethylene oxide, PEN (polyethylene naphthalate), PBT (polybutylene terephthalate), SBR (styrene butadiene rubber), polystyrene, PVC (polyvinyl chloride), polyvinyl alcohol, polyvinylidene fluoride, polyetyher sulfone, polyvinyl butylene, or derivatives or copolymers thereof or any combination thereof.

* * * * *